Patented Dec. 18, 1951

2,578,690

UNITED STATES PATENT OFFICE 2,578,690

ACCELERATORS FOR ADDENDUM TYPE RESINS

Howard L. Gerhart, Milwaukee, Wis., assignor to Pittsburgh Plate Glass Company, Allegheny County, Pa., a corporation of Pennsylvania No Drawing. Application October 4, 1949, Serial No. 119,560

35 Claims. (Cl. 260—45.3)

This invention relates to novel polymerizable compositions and methods of polymerization. It is known that polyenic esters of alpha,beta-unsaturated dicarboxylic acids and dihydric alcohols, such as ethylene glycol maleate and diethylene glycol maleate, will polymerize under catalysis by ultra-violet light or organic peroxides, such as benzoyl peroxide, tertiary butyl hydroperoxide, acetyl peroxide or like per compound, including organic peroxydicarbonate. This polymerization proceeds through a series of stages wherein the polymerizing liquid first thickens to a syrup, then sets up into a soft, solid gel which is insoluble in common organic solvents, and finally is converted to a hard polymer.

In general, a substantial period of time elapses before the polymerizing liquid is converted to the gel stage. Often, such long periods are objectionable. For example, in cast polymerization or molding processes, it is advantageous to increase the rate of gelation in order that cast polymers may be removed from a mold, and the mold reused in a short cycle. Also, it is desirable to provide cements and laminating resins which set up to a solid state rapidly, thus eliminating or minimizing the danger of drainage of the polymerizing resin from fibrous or like bases to which it may be applied.

According to this invention, it has been found that gelation of these unsaturated polyesters may be actively promoted by addition thereto of a small amount of an aldehyde amine which is a condensation product of a primary monoamine, $RNH_2$, with an aldehyde, $R_1CHO$, where R and $R_1$ are hydrocarbon radicals. An especially effective aldehyde amine for this purpose is butyraldehyde aniline, a condensation product of butyraldehyde and aniline.

Aldehyde amines capable of use, according to this invention, include those which are prepared by reacting one mole of amine with one or several moles of aldehyde, as disclosed in U. S. Patents Nos. 1,417,970, 1,556,415, 1,908,093 and 1,780,326. Typical condensation products prepared by reaction of equimolar amounts of amine and aldehyde are disclosed in U. S. Patents Nos. 1,417,970 and 1,908,093. Products obtained by reaction of amine with aldehyde in other proportions, for example, one mole of amine to as many as 15 moles of aldehyde, are disclosed in U. S. Patent No. 1,780,326.

A particularly satisfactory product is the condensation product of butyraldehyde and aniline sold by the E. I. Du Pont Company of Wilmington, Delaware, under the trade name of "808." Another product which is also contemplated comprises the condensation product of butyraldehyde and butylidene aniline, sold to the rubber industry by the Monsanto Chemical Company of St. Louis, Missouri, under the trade name of "A32."

In general, substantially any of the more common aldehyde-amine condensation products employable in rubber to retard aging and/or to promote vulcanization, are valuable accelerators or promoters of the addendum copolymerizations herein described. The aldehydes contemplated for condensation with amines include formaldehyde, acetaldehyde, propionaldehyde, aldol, butyraldehyde, heptaldehyde, and the like. Usually, the aldehydes are aliphatic and contain 1 to 7 carbon atoms.

The amines which can be condensed with any one of these aldehydes include butyl amine, ethyl amine, methyl amine, aniline, toluidene, xylidene, alpha or beta naphthyl amines and the like. In general, the amines contain up to 10 carbon atoms.

The amount of amine aldehyde used to effect the gelation ranges from essential traces, for example, 0.001 percent by weight of the polymerizable composition, to several percent, usually below 10 percent by weight of the polymerizable composition. The preferred amount used is about 0.25 to 3 percent by weight of the polymerizable composition.

The above aldehyde amines may be used to promote gelation of the unsaturated polyesters, either alone or in conjunction with organic peroxide catalysts or actinic light. Typical peroxy polymerization catalysts which may be used include benzoyl peroxide, ascaridole, acetyl peroxide, di-tert.-butyl peroxide, acetone peroxide, lauroyl peroxide and isopropyl peroxydicarbonate. The amount of such catalyst, if used, generally ranges between 0.1 and 5 percent (preferably 0.5 to 3 percent) by weight of the polymerizable composition.

The polyesters which are subject to gelation, according to this invention, are the alkyd type polyesters of dihydric alcohols and alpha,beta-unsaturated dicarboxylic acid, such as described in U. S. Letters Patent No. 2,443,741, granted to Kropa, or U. S. Letters Patent No. 2,450,552, granted to Hurdis. Typical unsaturated dicarboxylic acids contemplated include maleic, fumaric, itaconic, citraconic, mesaconic and aconitic acids, and halogenated derivatives of such acids, including chloromaleic acid and other acids, rarely containing more than 8 carbon atoms. Typical dihydric alcohols contemplated include ethylene glycol, 1,2-propylene glycol, 1,3-propylene glycol, dipropylene glycol, hexamethylene glycol or mixtures thereof, or like alcohols, rarely containing over 10 carbon atoms.

The dihydric alcohol and unsaturated dicarboxylic acid may be condensed with saturated dicarboxylic acid or anhydride, including phthalic anhydride, sebacic acid, adipic acid, azelaic acid, and succinic acid. Gelation of other similar unsaturated alkyd resins, including monohydric alcohol and monobasic acid modified polyesters known to the art, is within the scope of this invention. Typical alkyd polyesters which are polymerized according to this invention, include those prepared according to the following examples:

Example A

For example, 212 parts by weight of diethylene glycol and 196 parts by weight of maleic anhydride can be condensed to form polyesters, in accordance with conventional practice, by heating the mixture to a temperature of about 150°–200° C. for a period of 2 to 20 hours, or until the acid number of the mixture has been appropriately reduced, e. g. to 50 or 70.

Example B

Esters of maleic acid and other glycols, such as 1,2 or 1,3-propylene glycol, triethylene glycol, or the like, can be prepared by substitution of the requisite ratio of the appropriate glycol for diethylene glycol of Example A.

Example C

The maleic acid or maleic acid anhydride in Examples A and B can be replaced by fumaric acid, or by chloromaleic acid or its anhydride, or by methyl substituted maleic anhydride, or by similar acids and anhydrides, including the alpha,beta-unsaturated, alpha,beta-dicarboxylic structure.

Example D

In Examples A, B and C, mixed esters of the glycols enumerated, and phthalic or tetrachlorophthalic acid and the alpha,beta-unsaturated, alpha,beta-dicarboxylic acids were prepared by substituting the desired phthalic acid or anhydride for a part, e. g. 50%, of the unsaturated acid or anhydride.

As will become apparent from the ensuing disclosure, the dihydric alcohol esters may be polymerized alone, simply by adding the aldehyde amine to the ester. However, the invention is not limited to treatment of the esters alone, but is applicable to copolymerizable mixtures of such esters with liquid unsaturated olefinic polymerizable compounds containing one or more ethylenic groups linked to a negative radical, such as the radicals

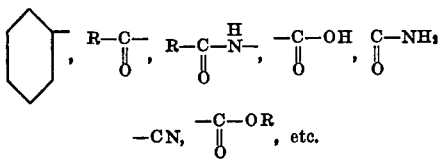

Typical compounds include styrene, vinyl acetate, vinyl chloroacetate, acrylic acid, methacrylic acid, maleic acid, methyl acrylate, methyl methacrylate, diallyl phthalate, diallyl maleate, acrylonitrile, allyl methacrylate, dimethallyl maleate or succinate, diallyl carbonate, triallyl citrate, and like polymerizable materials.

Thus, in order to prepare a copolymerizable mixture in which the promoters herein described can be employed with satisfaction, 25 to 50 parts by weight of the polyesters, e. g. maleic acid, diethylene glycol ester or 1,2-propylene glycol polyesters, may be combined with 50 to 10 parts by weight of polymerizable olefin, such as styrene, or other olefin mentioned above. If this mixture is to be stored for a substantial period of time, it is desirable to include in the mixture an inhibitor designed to prevent premature gelation. A mixture such as .065 part of trimethyl benzyl ammonium chloride and .0065 part of quinone constitutes a suitable inhibitor. With such inhibitors in the mixture, they may be maintained in storage for several months at room temperature, without gelation.

Of course, if the polymerizable mixture is to be used at once, the addition of such polymerization inhibitors is not required.

In practicing the process of this invention, the aldehyde amine is added just prior to use of the resin. For example, the aldehyde amine may be added at room temperature, or below, to the alkyd resin, and the resin immediately poured into a casting cell, or fibrous sheets immediately impregnated with the resin. Thereafter, the cell or impregnated sheets may be allowed to stand until the resin has gelled. If necessary, the resin may be heated to a temperature of 40°–125° C. in order to promote gelation. Peroxide catalysts may be added to the polyester, preferably prior to addition of the aldehyde amine. In such case, the polymer may be hardened to its final state of cure by heating at conventional temperatures, usually above 50° C. and up to 300° C., but not in excess of charring temperature. Where no peroxide is used, longer heating is required. However, gels produced with aldehyde amine, but in the absence of peroxy catalyst, may be hardened by exposure to ultra-violet light or other actinic polymerizing light at room temperature or elevated temperature, according to conventional methods.

The following constitute typical examples of the invention herein contemplated:

Example I

Composition of mixture:

30 parts ¹ diethylene maleate (acid number of 40)  
19 parts styrene  
.1% trimethyl benzyl ammonium chloride } inhibitor  
.001 part quinone  
¹ Parts are by weight.

In the formation, parts are by weight. The two latter constituents (trimethyl benzyl ammonium chloride and quinone) constitute inhibitors to increase the stability of the mixture during periods of storage. Such mixture is stable for at least 6 months, at 77° F. It does not gel within 20 hours at room temperature, even in the presence of 1% of benzoyl peroxide. If, to the foregoing composition, 1% of a condensation product of butyraldehyde and aniline, which is an age retarder in rubber and known commercially as "808" previously referred to, is added, the resin will begin to thicken or gel at room temperature almost as soon as the accelerator is added. The temperature will rise exothermally, so that a quart jar filled with the mixture may reach a temperature of 200° F. as polymerization proceeds. If the temperature of the mixture is maintained at 250° F. or thereabouts for 10 minutes, the entire mass will will harden into a typical horny, tough, plastic state.

Example II

The polymerizable mixture in this instance comprises:

100 parts ethylene maleate (acid number 70)
40 parts styrene
10 parts maleic anhydride
.1% of the foregoing mixture of benzyl ammonium chloride
.001% of the mixture, quinone To the mixture, a catalyst of polymerization, such as 1% of a condensation product of aniline and formaldehyde, was added just before it was poured into a mold. The mixture began to gel and thicken within one minute after the accelerator was completely stirred into the mixture. The rate of polymerization could be controlled by diluting the mixture with a medium, such as acetone, or by cooling the mixture until a desired rate of reaction had been obtained.

Example III

In this example, a glass cylinder containing a delicate electrical wiring was filled with a syrupy mixture comprising 250 parts propylene maleate, 200 parts styrene, to which had been added 1% of a commercial condensation product of butyraldehyde and butylidene aniline, known as "A32." The source of this material has already been referred to. Although this mixture was at room temperature initially, it began to gel and harden within 3 minutes after the catalyst was added.

In some instances, it may be desirable to combine the action of the aldehyde-amine condensation product with a peroxide type catalyst. Thus, in any one of the foregoing examples, .5 to 3% of a catalyst, such as benzoyl peroxide, tertiary butyl hydroperoxide, or acetyl peroxide or the like, can be added. These peroxide type catalysts become effective after the polymerization has been initiated by the amine-aldehyde condensation products.

Additional examples of the application of the principles of the invention include:

Example IV 35 parts diethylene maleate
15 parts styrene
0.05 part trimethyl benzyl ammonium chloride } inhibitor
0.0005 part quinone To this mixture, .025 to 2% of an aldehyde-amine condensate, which is an age retarder in vulcanized rubber, could be added. Examples of condensation products are: butyraldehyde-aniline heptaldehyde-aniline, acetaldehyde-aniline, butylamine-butyraldehyde, etc. The catalyst is added just prior to casting.

Example V 35 parts diethylene ethylene maleate phthalate
18 parts styrene
5 parts maleic anhydride } inhibitor
0.058 part (1%) pyridyl maleate Catalyst: Same as Example IV. 1% of benzoyl peroxide can also be added at any time up to 20 hours before casting.

Example VI 35 parts propylene maleate phthalate
18 parts styrene
0.053 part (0.1%) trimethyl benzyl ammonium chloride } inhibitor
0.00053 part quinone Catalysts: Same as given in Examples IV or V.

Example VII 35 parts ethylene-3,6 endomethylene 4-tetrahydrophthalate
18 parts styrene
5 parts maleic anhydride
0.29 part (0.5%) dimethylaniline hydrochloride } inhibitor
0.0116 part (0.02%) quinone Catalysts: Same as given in Examples IV or V.

Example VIII 35 parts 1,2 or 1,3 propylene maleate
18 parts styrene
0.053 part (0.1%) trimethyl amine hydrochloride } inhibitor
0.00053 part (0.001%) quinone Catalysts: Same as given in Examples IV and V.

Example IX 35 parts diethylene fumarate
18 parts styrene
0.053 part (0.1%) triethyl benzyl ammonium chloride } inhibitor
0.00053 part (0.001%) hydroquinone Catalysts: Same as given in Examples IV and V.

Example X 40 parts propylene adipate maleate
25 parts styrene
0.053 part (0.1%) trimethyl benzyl ammonium bromide } inhibitor
0.00053 part hydroquinone Catalysts: Same as given in Examples IV or V.

Example XI 35 parts diethylene maleate azelate
25 parts styrene
0.053 part (0.1%) triethylbenzyl ammonium sulfate } inhibitor
0.00053 part (0.001%) quinone Catalysts: Same as given in Examples IV or V.

Example XII

Diethylene glycol maleate was prepared by mixing 2580 pounds of diethylene glycol with 2130 pounds of maleic anhydride, and heating at a temperature up to about 200° C. until the resulting resin had an acid number of 32. Thereupon, the product was blown with carbon dioxide, while heating was continued, until the product had an acid number of 23.3.

Thirty-five grams of the diethylene glycol maleate thus produced was mixed with 18 grams of styrene and 15 grams of maleic anhydride, and one drop of butyraldehyde aniline (Du Pont 808) was added to the mixture. This mixture gelled within 5 minutes.

Also, when 20 grams of the diethylene glycol maleate was mixed with 10 grams of styrene and one drop of butyraldehyde aniline, the mixture gelled within 5 minutes.

These gels may be hardened by radiation with ultra-violet light.

Example XIII

Resinous propylene glycol maleate-phthalate was prepared by heating together 375 pounds of maleic anhydride, 566 pounds of phthalic anhydride, and 658 pounds of propylene glycol, according to standard alkyd resin techniques, to produce a polyester having an acid number of about 20.

The following composition was prepared using this polyester:

| | Pounds |
|---|---|
| Propylene glycol-maleate phthalate | 35 |
| Styrene | 18 |
| Trimethyl benzyl ammonium acetate | 0.053 |
| Quinone | 0.00053 |

To 100 grams of this mixture was added one gram of butyraldehyde aniline (Du Pont 808). The mixture gelled in 7 minutes.

Example XIV

The polyester of Example XIII was mixed with an equal part by weight of vinyl acetate, and 1 percent by weight (based upon the total weight of polyester and vinyl acetate) of butyraldehyde aniline was added to the mixture. This mixture began to gel within about an hour, whereas the mixture without butyraldehyde aniline is stable indefinitely. When 0.5 percent by weight of benzoyl peroxide is added, in addition to the butyraldehyde aniline, the rate of gelation is increased.

*Example XV*

Two grams of butyraldehyde aniline is added to 100 grams of diethylene glycol maleate prepared as in Example XII. The mixture gels on heating to 70° C. for a short time. When 0.5 to 5 percent of tertiary butyl hydroperoxide or benzoyl peroxide is used in conjunction with the aldehyde amine, the time of gelation is materially shortened, even at room temperature.

In all of the examples, the inhibitor mixture can be omitted if casting is performed promptly after the mixture is made up. Plasticizers, such as dimethyl phthalate, can be included in appropriate amount, e. g. 5 to 25%, in the foregoing formulations. Also, pigments, such as carbon black, titanium dioxide, or the like, can be added. Also, fibers, such as spun glass staple, asbestos, or wood pulp can be added to increase strength. The fibers should be added before the catalyst.

Polymerizable mixtures of the type above described, and including aldehyde amine catalysts, may be introduced into suitable molds of any desired configuration for purposes of hardening to a shape conforming to the molds. The promoters or catalysts cause the rapid hardening of the copolymerizable mixtures to a state admitting of the removal of the molds within a relatively short period of time.

If the compositions are to be employed as cements or adhesives, it will be apparent that aldehyde-amine condensation products can be added just prior to the application of the cements to the surface to be joined or, if desired, the surfaces, after they have been coated with the polymerizable mixtures, can be moistened with a small amount of the catalyst or with a solution, such as an acetone solution of the catalyst. The application of copolymerizable mixtures as coatings to surfaces, followed by the application of a solution of a catalyst by spraying or dipping in order to harden the films in situ, is contemplated. The formation of films or foils upon polished metal plates or belts, by spraying polymerizable mixtures upon such surfaces with solutions of catalysts or by dipping the films upon the support into solutions of catalysts, is contemplated. Similarly, the use of copolymerizable mixtures in the formulation of printing inks is within the purview of the invention. An ink embodying such copolymerizable mixtures as given in the examples herein, and including dyes or pigments, e. g. lamp black, can be applied as an ink by conventional printing operations with types or plates to paper or cloth webs. After the impression has been made, the inks can be hardened almost instantly by spraying the printed surface with a solution of aldehyde-amine condensation product. If desired, hardening of the films or inks can be further accelerated by baking or heating them after application.

In applications in which copolymer resins are to be used to impregnate porous materials, a solution of the catalysts may be introduced into the interstices of the porous material by dipping in a 1% to 10% solution. Thus a 3% solution of "808" in acetone, may be used to deposit this catalyst in leather, paper, asbestos, sisal cotton batting, glass fiber and cellular glass, rubber or plastic, simply by passing the material to be impregnated through the catalyst solution, draining off the excess, and oven drying for 5 minutes at 200° F. to remove the acetone. The materials are then saturated with a copolymer resin by dipping, soaking, or by vacuum impregnation methods. Curing the resin is much more rapid than when no catalyst is used and, with suitable resins, may be accomplished by heating for 3 to 30 minutes at 250° F.

In the case of paper coating applications, it is advantageous to soak the paper to be coated in a similar catalyst solution. Subsequent paper coating operations are made more economical because the catalyst causes a very rapid gellation of the resin. This prevents the loss of volatile polymerizable olefins, such as styrene, during the curing of the resin in the paper coating machine.

In the above, it is of course contemplated that the copolymer resin contains from 0.5 to 3% benzoyl peroxide or other peroxide. The accelerators are especially beneficial to initiate the gellation or polymerization reaction, as well as to assist the cure of the resins in the presence of benzoyl peroxide.

The forms of the invention herein described are to be considered merely as being by way of example. It will be apparent to those skilled in the art that numerous modifications may be made therein without departure from the spirit of the invention or the scope of the appended claims.

This application is a continuation-in-part of my application, Serial No. 625,954, filed October 31, 1945, now abandoned.

In the above application, reference is made to the use of certain quaternary ammonium chlorides as polymerization inhibitors. Such use forms no part of my invention but is the invention of another.

I claim:

1. A method of polymerization which comprises adding to a dihydric alcohol ester of an alpha, beta-unsaturated dicarboxylic acid, a small effective amount of an aldehyde amine which is the reaction product of equimolar amounts of an aldehyde of the formula RCHO, in which R is a hydrocarbon group, and a primary monoamine of the formula $R_1NH_2$, in which $R_1$ is a hydrocarbon group.

2. A method of polymerization which comprises adding to a curable polyester of a dihydric alcohol and an alpha,beta-unsaturated dicarboxylic acid, a small effective amount of an organic peroxide curing catalyst, and a small effective amount of a promoter comprising an aldehyde amine, which aldehyde amine is the reaction product of equimolar amounts of an aldehyde of the formula RCHO, in which R is a hydrocarbon group, and a primary monoamine of the formula $R_1NH_2$, in which $R_1$ is a hydrocarbon group.

3. The process of claim 1 in which the aldehyde amine is butryaldehyde aniline.

4. The process of claim 2 in which the aldehyde amine is butryaldehyde aniline.

5. A method of polymerization which comprises adding to a mixture of styrene and a polyester of a dihydric alcohol and an alpha, beta-unsaturated dicarboxylic acid, an organic peroxidic curing catalyst in amount from 0.5 to 3%, based on said mixture, and a promoter comprising an aldehyde amine in an amount from 0.001 to 3%, based on said mixture, said aldehyde amine being the reaction product of equimolar amounts of an aldehyde of the formula RCHO, in which R is a hydrocarbon group, and a primary monoamine of the formula $R_1NH_2$, in which $R_1$ is a hydrocarbon group.

6. A method of polymerization which comprises adding to a polymerizable-dihydric alcohol-unsaturated dicarboxylic acid-unsaturated alkyd resin a small effective amount of an aldehyde amine which is the reaction product of at least one mole of an aldehyde of the formula RCHO, in which R is a hydrocarbon group, with one mole of a primary monoamine of the formula $R_1NH_2$, in which $R_1$ is a hydrocarbon group.

7. A method of polymerization which comprises adding to a polymerizable-dihydric alcohol-unsaturated dicarboxylic acid-unsaturated alkyd resin a small effective amount of an organic peroxide curing catalyst, and a small effective amount of a promoter comprising an aldehyde amine, which aldehyde amine is the reaction product of at least one mole of an aldehyde of the formula RCHO, in which R is a hydrocarbon group, with one mole of a primary monoamine of the formula $R_1NH_2$, in which $R_1$ is a hydrocarbon group.

8. The process of claim 6, in which the aldehyde amine is butyraldehyde aniline.

9. A method of polymerization which comprises adding to a mxture of vinyl acetate and a curable polyester of a dihydric alcohol and an alpha,beta-unsaturated dicarboxylic acid, a small effective amount of an organic peroxide curing catalyst, and a small effective amount of a promoter comprising an aldehyde amine, which aldehyde amine is the reaction product of equimolar amounts of an aldehyde of the formula RCHO, in which R is a hydrocarbon group, and a primary monoamine of the formula $R_1NH_2$, in which $R_1$ is a hydrocarbon group.

10. A method of converting a linear curable thermoplastic composition comprising a polyester, into a cured non-thermoplastic polymer, which comprises adding to said mixture an organic peroxidic curing catalyst in an amount from 0.5 to 3%, based on said composition, and a promoter comprising an aldehyde amine in an amount from 0.001 to 3%, based upon said composition, said linear curable thermoplastic polyester being the esterification product of a saturated, unsubstituted, aliphatic dihydric alcohol and an alpha,beta-unsaturated, unsubstituted, alpha,beta-unsaturated dicarboxylic acid, and said aldehyde amine being the reaction product of equimolar amounts of an aldehyde of the formula RCHO, in which R is a hydrocarbon group, and a primary monoamine of the formula $R_1NH_2$, in which $R_1$ is a hydrocarbon group.

11. A method of converting a linear, curable thermoplastic composition comprising a polyester, into a cured non-thermoplastic polymer, which comprises adding to said mixture a promoter comprising an aldehyde amine in an amount from 0.001 to 3%, based upon said composition, said linear curable thermoplastic polyester being the esterification product of a saturated, unsubstituted, aliphatic dihydric alcohol and an alpha, beta-unsaturated, unsubstituted, alpha, beta-unsaturated dicarboxylic acid, and said aldehyde amine being the reaction product of equimolar amounts of an aldehyde of the formula RCHO, in which R is a hydrocarbon group, and a primary monoamine of the formula $R_1NH_2$, in which $R_1$ is a hydrocarbon group.

12. A method of polymerization which comprises adding to a dihydric alcohol ester of an alpha-beta unsaturated dicarboxylic acid a small effective amount of an aldehyde amine which is the reaction product of at least one mole of an aldehyde of the formula RCHO, in which R is a hydrocarbon group, with one mole of a primary monoamine of the formula $R_1NH_2$ in which $R_1$ is a hydrocarbon group.

13. The process of claim 12 in which the unsaturated dicarboxylic acid is maleic acid.

14. A method of polymerization which comprises adding to a polyester of a dihydric alcohol and an alpha-beta unsaturated dicarboxylic acid a small effective amount of an organic peroxide curing catalyst and a small effective amount of a promotor comprising an aldehyde amine, which aldehyde amine is the reaction product of at least one mole of an aldehyde of the formula RCHO in which R is a hydrocarbon group, with one mole of a primary monoamine of the formula $R_1NH_2$ in which $R_1$ is a hydrocarbon group.

15. The process of claim 14 in which the unsaturated acid is maleic acid.

16. A method of polymerization which comprises adding to a mixture of styrene and a polymerizable dihydric alcohol-unsaturated dicarboxylic acid alkyd polyester, a small effective amount of an aldehyde amine which is the reaction product of at least one mole of an aldehyde of the formula RCHO, in which R is a hydrocarbon group, and one mole of a primary monoamine of the formula $R_1NH_2$ in which $R_1$ is a hydrocarbon group.

17. The process of claim 16 wherein the aldehyde amine is the reaction product of equimolar amounts of aldehyde and amine.

18. A process of forming a resinous conjointly polymerized product of styrene and a polyester of an alpha-beta unsaturated, alpha-beta dicarboxylic acid and a dihydric alcohol, which process comprises incorporating into the mixture of polyester and styrene just prior to polymerization, .25 to 3%, based upon the polymerizable mixture, of a condensation product of butyraldehyde and aniline, which condensation product is an age retarder in vulcanized rubber, introducing the mixture into molds, and permitting polymerization to proceed.

19. A process of forming a resinous copolymerization product of styrene and a polyester of maleic acid and propylene glycol, which process comprises incorporating into a mixture of styrene and said polyester just prior to polymerization, .25 to 3%, based upon the polymerizable mixture, of a butyraldehyde aniline condensation product which is a retarder in the aging of vulcanized rubber.

20. A process as in claim 5 in which the aldehyde amine is butyraldehyde aniline.

21. A method of converting a copolymerizable mixture of styrene and a linear, curable, thermoplastic polyester into a cured, non-thermoplastic copolymer, which comprises adding to said mixture a small but effective amount of an organic peroxidic curing catalyst and a small but effective amount of a promoter comprising an aldehyde amine, said linear, curable, thermoplastic polyester being the esterification product of a saturated unsubstituted aliphatic dihydric alcohol and an alpha-beta unsaturated, unsubstituted alpha-beta dicarboxylic acid, and said aldehyde amine being the reaction product of equimolar amounts of an aldehyde of the formula RCHO in which R is a hydrocarbon group, and a primary monoamine of the formula $R_1NH_2$ in which $R_1$ is a hydrocarbon group.

22. A method of converting a copolymerizable mixture of styrene and a linear, curable, thermoplastic polyester into a cured, non-thermoplastic copolymer, which comprises adding to said mixture an organic peroxidic curing catalyst in an amount from 0.5 to 3%, based on said mixture, and a promoter comprising an aldehyde amine in an amount from 0.25 to 3%, based on said mixture, said linear, curable, thermoplastic polyester being the esterification product of a saturated, unsubstituted, aliphatic, dihydric alcohol and dicarboxylic acid selected from the group consisting of alpha-beta unsaturated, unsubstituted alpha-beta dicarboxylic acid and mixtures of said unsaturated acid with dicarboxylic acids that contain no aliphatic unsaturation, and said aldehyde amine being the reaction product of equimolar amounts of an aldehyde of the formula RCHO in which R is a hydrocarbon group, and a primary monoamine of the formula $RNH_2$ in which R is a hydrocarbon group.

23. A method of converting a copolymerizable mixture of styrene and a linear, curable, thermoplastic polyester into a cured, non-thermoplastic copolymer, which comprises adding to said mixture an organic peroxidic curing catalyst in an amount from 0.5 to 3%, based on said mixture, and a promoter comprising an aldehyde amine in an amount from 0.25 to 3%, based on said mixture, said linear, curable, thermoplastic polyester being the esterification product of a saturated, unsubstituted, aliphatic, dihydric alcohol and a mixture of an alpha-beta unsaturated, unsubstituted alpha-beta dicarboxylic acid and a saturated, unsubstituted, aliphatic, dicarboxylic acid, and said aldehyde amine being the reaction product of equimolar amounts of an aldehyde of the formula RCHO, in which R is a hydrocarbon group, and a primary monoamine of the formula $RNH_2$ in which R is a hydrocarbon group.

24. The process of claim 16 wherein the aldehyde is butyraldehyde.

25. The process of claim 16 wherein the aldehyde is formaldehyde.

26. The process of claim 16 wherein the dicarboxylic acid is endomethylene tetrahydrophthalic acid.

27. The process of claim 16 wherein the dicarboxylic acid is maleic acid.

28. The process of claim 16 wherein a small effective amount of organic peroxide curing catalyst also is added to the polyester.

29. The process of claim 23, in which the aldehyde is butyraldehyde.

30. The process of claim 23, in which the aldehyde is formaldehyde.

31. The process of claim 23, in which the aldehyde amine is butryaldehyde aniline.

32. The process of claim 23, in which the ester is a polyester of maleic acid and propylene glycol, and the aldehyde amine is butyraldehyde aniline.

33. The process of claim 23, in which the dicarboxylic acid is endomethylene tetrahydrophthalic acid.

34. The process of claim 23, in which the ester is a polyester of maleic anhydride and diethylene glycol.

35. The process of claim 23, in which the unsaturated acid is maleic acid.

HOWARD L. GERHART.

No references cited.